(12) United States Patent
Ballu

(10) Patent No.: US 8,272,932 B2
(45) Date of Patent: Sep. 25, 2012

(54) VENTILATION SYSTEM FOR A CAB OF AN AGRICULTURAL MACHINE INVOLVED IN SPRAYING OPERATIONS, AND AN AGRICULTURAL MACHINE FITTED WITH SUCH A SYSTEM

(75) Inventor: Patrick Ballu, Reims (FR)

(73) Assignee: Exel Industries, Epernay (FR)

( * ) Notice: Subject to any disclaimer, the term of this patent is extended or adjusted under 35 U.S.C. 154(b) by 594 days.

(21) Appl. No.: 11/905,069

(22) Filed: Sep. 27, 2007

(65) Prior Publication Data
US 2008/0081549 A1 Apr. 3, 2008

(30) Foreign Application Priority Data
Oct. 3, 2006 (FR) ...................................... 06 54071

(51) Int. Cl.
*B05B 1/20* (2006.01)
(52) U.S. Cl. ...................................... 454/145
(58) Field of Classification Search ................ 454/145
See application file for complete search history.

(56) References Cited

U.S. PATENT DOCUMENTS

| 5,468,183 | A | 11/1995 | Hahn |
| 2003/0156043 | A1 | 8/2003 | Doescher |
| 2005/0169813 | A1* | 8/2005 | D'Amico et al. ............. 422/124 |
| 2006/0035578 | A1* | 2/2006 | Geiger .......................... 454/139 |

FOREIGN PATENT DOCUMENTS

| EP | 0 120 753 A | 10/1984 |
| FR | 2 522 791 A | 9/1983 |

* cited by examiner

Primary Examiner — Steven B McAllister
Assistant Examiner — Samantha Miller
(74) Attorney, Agent, or Firm — Dowell & Dowell, PC

(57) ABSTRACT

The ventilation system for a cab (1) of an agricultural machine involved in spraying operations comprises;
at least one outside air intake (7);
at least one air outlet (29) opening out into said cab (1);
means (14) for causing air coming from said outside air intake (7) to flow towards said air outlet (29);
means (11) for selectively closing said outside air intake, referred to as first closure means; and
means (21, 23) for controlling the spraying function.
The first closure means (11) are slaved to said control means (21, 23) in such a manner that activating and deactivating the spraying function lead respectively to said air intake (7) being closed and opened by said first closure means (11).

8 Claims, 4 Drawing Sheets

VENTILATION SYSTEM FOR A CAB OF AN AGRICULTURAL MACHINE INVOLVED IN SPRAYING OPERATIONS, AND AN AGRICULTURAL MACHINE FITTED WITH SUCH A SYSTEM

BACKGROUND OF THE INVENTION

1. Field Of The Invention

The present invention relates to a ventilation system for a cab of an agricultural machine involved in spraying operations, and to an agricultural machine fitted with such a system.

2. Brief Description Of The Related Art

As is known in itself, e.g. from document EP-A-0 120 753, the cabs of agricultural machines involved in spraying operations (self-propelled sprayers, tractors towing or carrying sprayers) are fitted with ventilation means that enable air to be caused to circulate in the space in which the operator is to be found.

During spraying operations, a portion of the air that has been polluted by the agricultural chemicals being sprayed flows inside the ventilation system and therefore penetrates into the cab where the operator is to be found.

In addition to the fact that, in the long term, this is dangerous for the operator (since agricultural chemicals are very harmful), any filters that might be present in the ventilation system become clogged quickly, which means that they need to be changed frequently.

SUMMARY OF THE INVENTION

A particular object of the present invention is to remedy those drawbacks.

This object of the invention is achieved with a ventilation system for a cab of an agricultural machine involved in spraying operations, the system being of the type comprising:

at least one outside air intake;

at least one air outlet opening out into said cab;

means for causing air coming from said outside air intake to flow towards said air outlet;

means for selectively closing said outside air intake, referred to as first closure means; and means for controlling the spraying function;

said first closure means being slaved to said control means in such a manner that activating and deactivating the spraying function lead respectively to said air intake being closed and opened by said first closure means.

Because the first closure means are slaved to the means for controlling the spraying function, during stages when spraying is taking place, the outside air intake is closed automatically, thereby serving to isolate the cab from any air that has been polluted by the agricultural chemical, and also serving to avoid the filters of the ventilation system becoming clogged, where applicable.

According to other characteristics that are optional in the air conditioning system of the invention:

the system further comprises filter means for filtering the incoming air in said outside air intake: said filter means serving to improve the quality of the air that enters into the cab;

the system further comprises means for modifying the temperature of the air: said means enabling the operator to heat and/or cool the air in the cab;

the system further comprises at least one recycling inlet for recycling the air in said cab: this recycling inlet enables the cab to be ventilated when the outside air intake is closed;

the system further comprises second selective closure means for closing said recycling inlet, said second closure means being slaved to said control means in such a manner that activating and deactivating the spraying function lead respectively to said recycling inlet being opened and closed by said second closure means: these second closure means enable the rate at which outside air is sucked in to be increased during periods when the spraying function is deactivated;

said first and second closure means comprise a single flap capable of selectively closing said air intake and said recycling inlet: the use of a single flap for selectively closing those two openings constitute an embodiment that is simple and inexpensive;

said system further comprises an air outlet and third selective closure means for closing said air outlet, said third closure means being slaved to said control means in such a manner that activating and deactivating the spraying function lead respectively to said air outlet being opened and closed by said third closure means: these third closure means enable the air situated inside the cab to be exhausted more quickly during periods when the spraying function is deactivated; and the system further comprises means for delaying the opening of said first closure means relative to the moment at which the spraying function is deactivated: this delay serves to ensure that there remains no air that has been polluted by spraying at the time when the first closure means are opened.

The present invention also provides an agricultural machine involved in spraying operations that is fitted with a system in accordance with the above.

Other characteristics and advantages of the present invention appear on reading the following description and on examining the accompanying figures, in which:

DESCRIPTION OF THE PREFERRED EMBODIMENT

Figure 1:
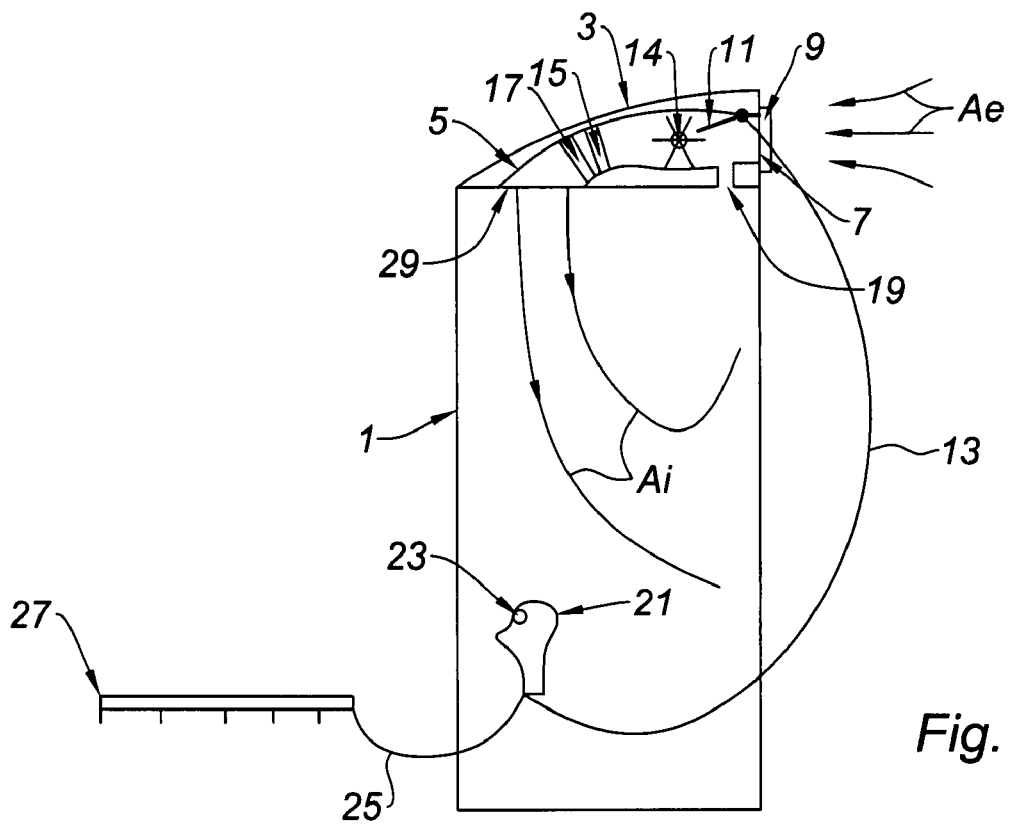
FIG. 1 is a diagrammatic view of a first embodiment of the system of the invention, with the spraying function being deactivated.

Reference is made initially to FIG. 1, which shows the cab 1 of an agricultural sprayer machine, such as a self-propelled machine, for example.

In its top portion, the cab 1 includes ventilation means 3.

The ventilation means comprise one or more ducts 5 opening out firstly to the outside of the cab, and secondly to the inside of the cab.

The portion of the duct 5 that opens to the outside of the cab constitutes an outside air intake 7, preferably provided with a filter complex 9 that may typically comprise a media filter, a paper filter, and a carbon filter.

The outside air intake 7 can be closed in selective manner by one or more flaps 11 that are electrically controlled by a circuit 13.

In the duct 5, and downstream from the filter complex 9 and from the flap 11, there are air circulation means that may comprise one or more fans 14, possibly together with means capable of modifying the temperature of the air, which means may typically comprise a heating heat exchanger 15 and a cooling heat exchanger 17.

It should also be observed that one or more recycling inlets 19 are provided between the cab 1 and the duct 5.

The circuit 13 for controlling the flap 11 is connected to the handle 21 for controlling spraying operations, which handle includes in particular a switch 23 for switching spraying operations on or off.

The control handle 21 is naturally also connected to an electric circuit 25 for use in on/off switching of spraying from spray bars 27.

In FIG. 1, spraying is deactivated: the flap 11 is therefore in the open position, enabling non-polluted outside air Ae to enter into the inside of the duct 5 and into the cab 1.

Figure 2:
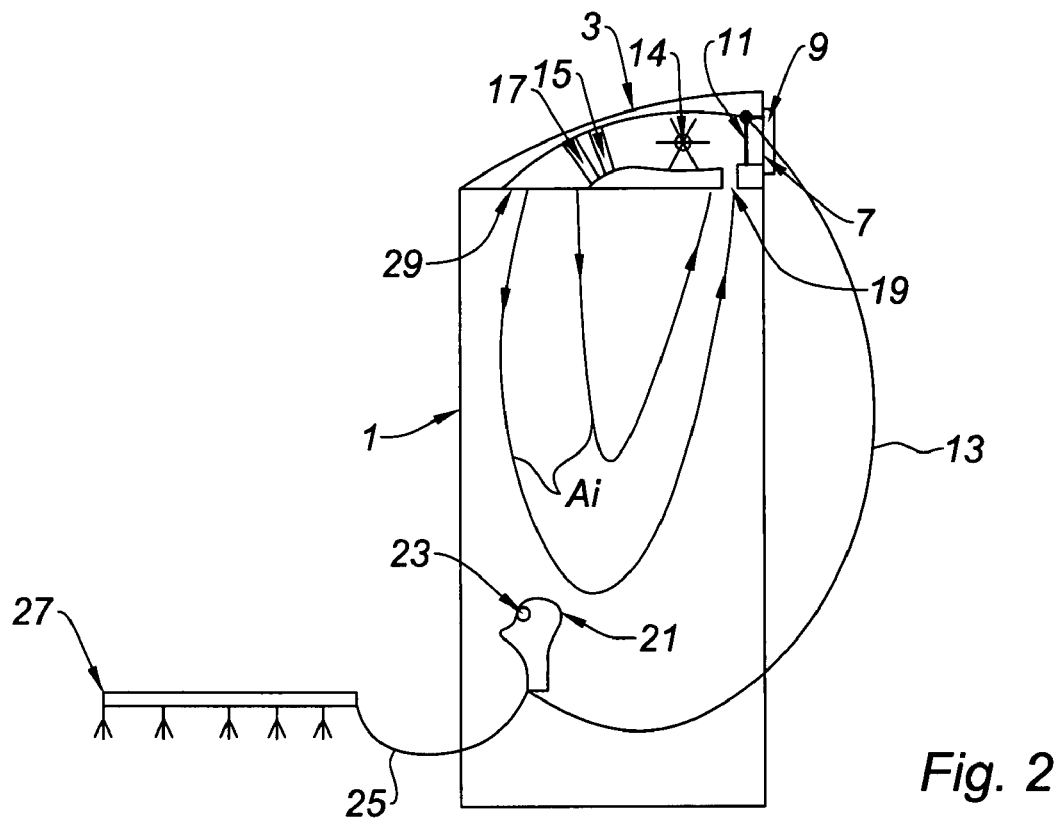
FIG. 2 is a view of the same system when the spraying function is activated.

When the operator starts a spraying operation by acting on the switch 23 situated on the control handle 21, an electrical signal travels via the control circuit 13 so as to bring the flap 11 towards its closed position, as shown in FIG. 2.

In the configuration shown in FIG. 2, the cab 1 is isolated from outside air, and the inside air Ai is recycled within the cab by circulating between the outlet 29 of the duct 5 that forms an air vent, and the recycling inlet 19.

The cab 1 is then completely isolated from the outside, thus avoiding any air that has been polluted by the sprayed agricultural chemical from entering: the operator situated inside the cab 1 is thus protected from the harmful effects of the chemical, and the filter complex 9 is spared any risk of becoming clogged.

It should also be observed that this operation in recycling mode makes it possible to improve the efficiency of the conditioning system 3 considerably, and also to heat or cool the inside of the cab 1 very quickly.

Figure 3:
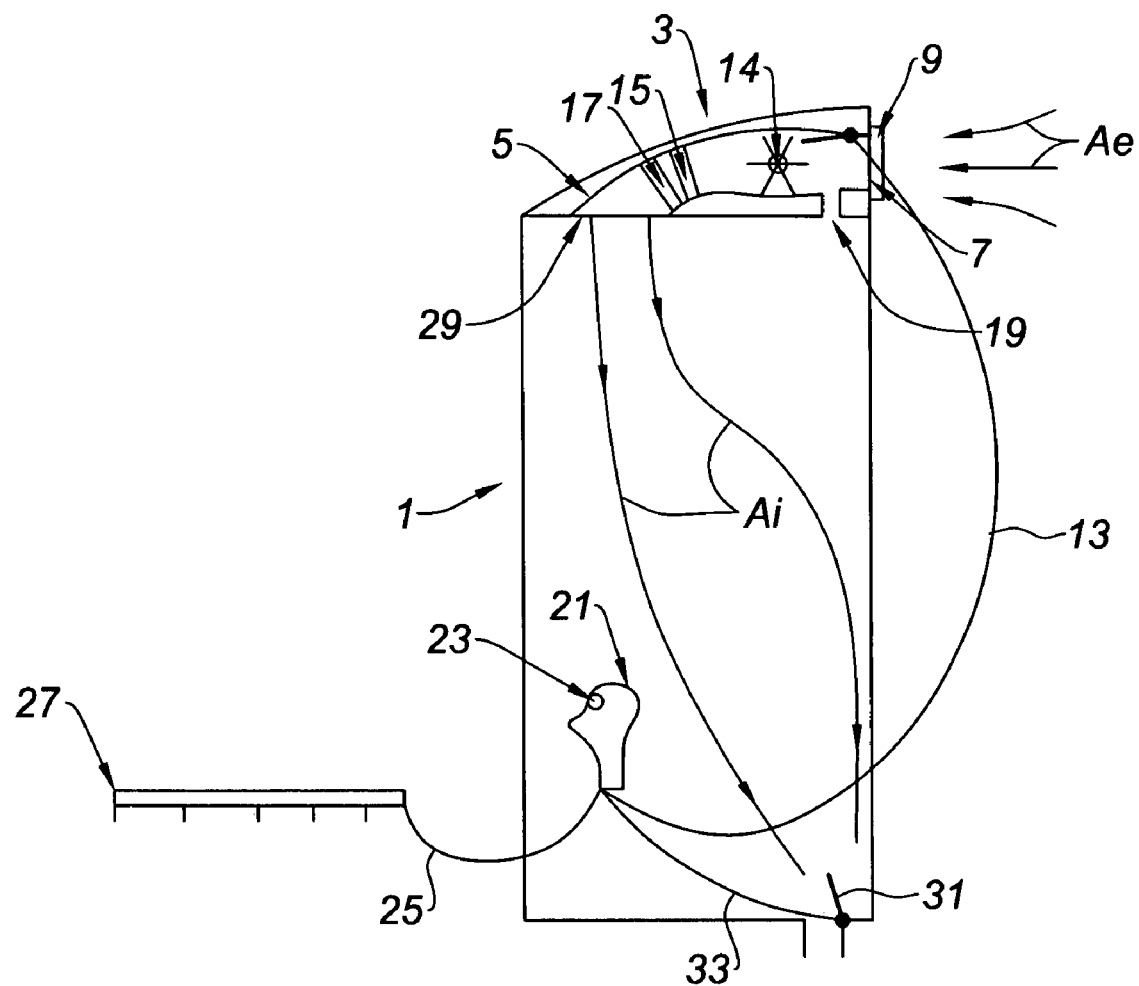
FIG. 3 is a view of a second embodiment of the system of the invention, with the spraying function being deactivated.

The embodiment of FIG. 3 differs from that shown in FIGS. 1 and 2 in that it has a second flap enabling an air outlet from the cab to be closed selectively.

Opening this second flap 31 at the same time as the first flap 11 makes it possible, while spraying is deactivated, to increase the flow of air leaving the duct 5 and passing through the cab 1.

This second flap 31 is controlled electrically by an electric circuit 33 connected to the control handle 21.

Figure 4:
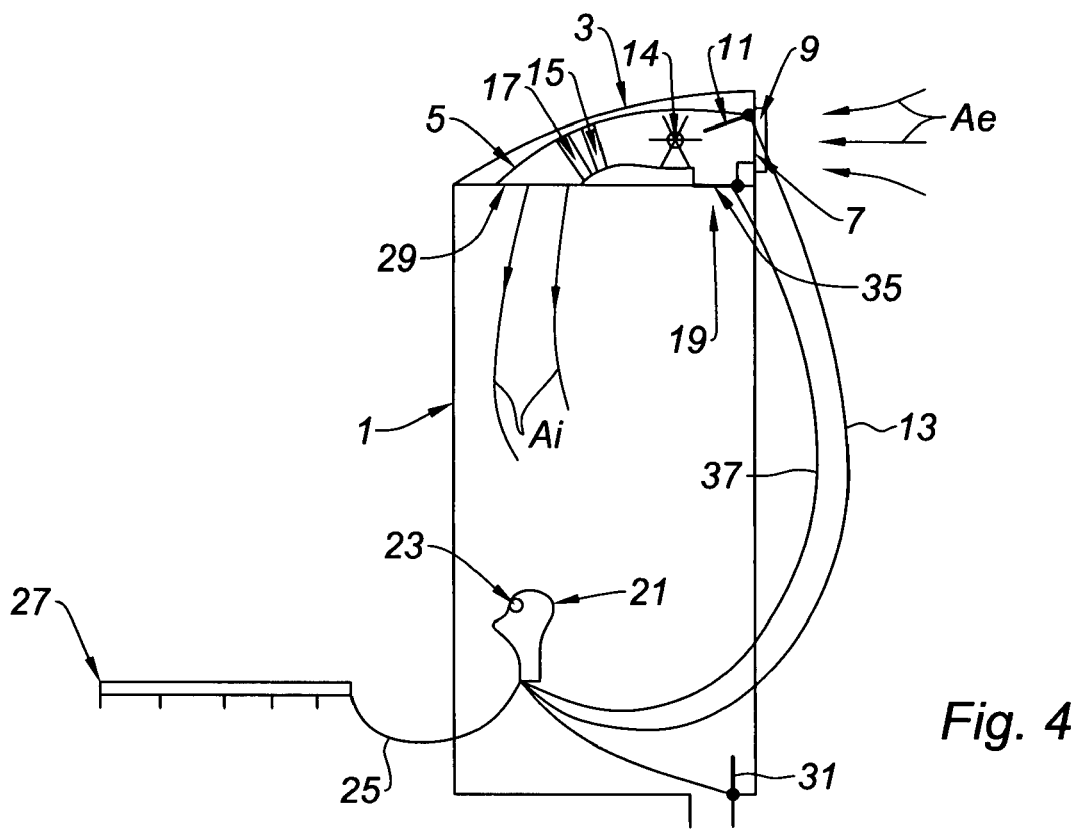
FIG. 4 is a view of a third embodiment of the system of the invention, with the spraying function being deactivated.
Figure 5:
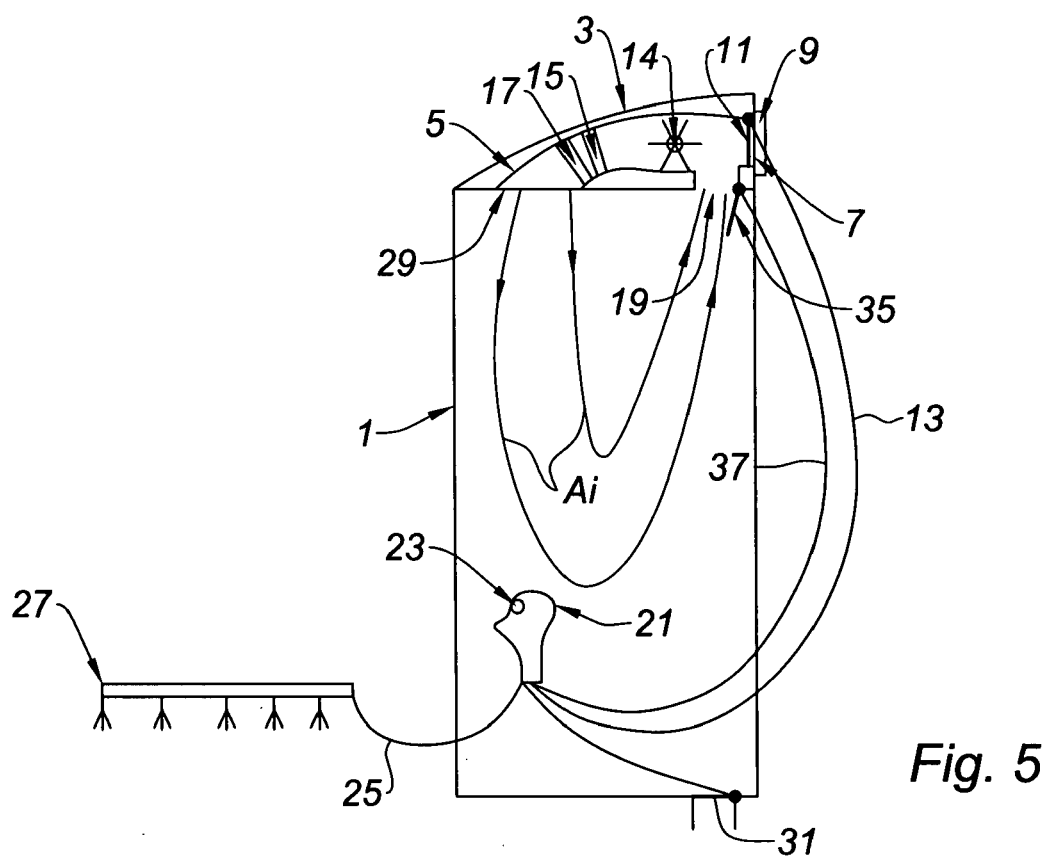
FIG. 5 is a view of the same system, with the spraying function being activated.

In the embodiment of FIGS. 4 and 5, in addition to the first flap 11 and the second flap 31, the system of the invention includes a third flap 35 suitable for selectively closing the recycling inlet 19.

The third flap 35 is controlled by an electric circuit 37 connected to the control handle 21.

When spraying is deactivated (FIG. 4), the first and second flaps 11 and 31 are in the open position, as in embodiment 3, and the third flap 35 is in the closed position, thus serving to eliminate any recycling, and thereby maximizing the extent to which the cab 1 is swept by clean, fresh air coming from the outside.

In contrast, when spraying is activated (FIG. 5), the first flap 11 and the second flap 31 are closed, thereby preventing any polluted outside air penetrating into the inside of the cab 1.

The third flap 35 is open, enabling the air Ai situated inside the cab 1 to be recycled.

Figure 6:
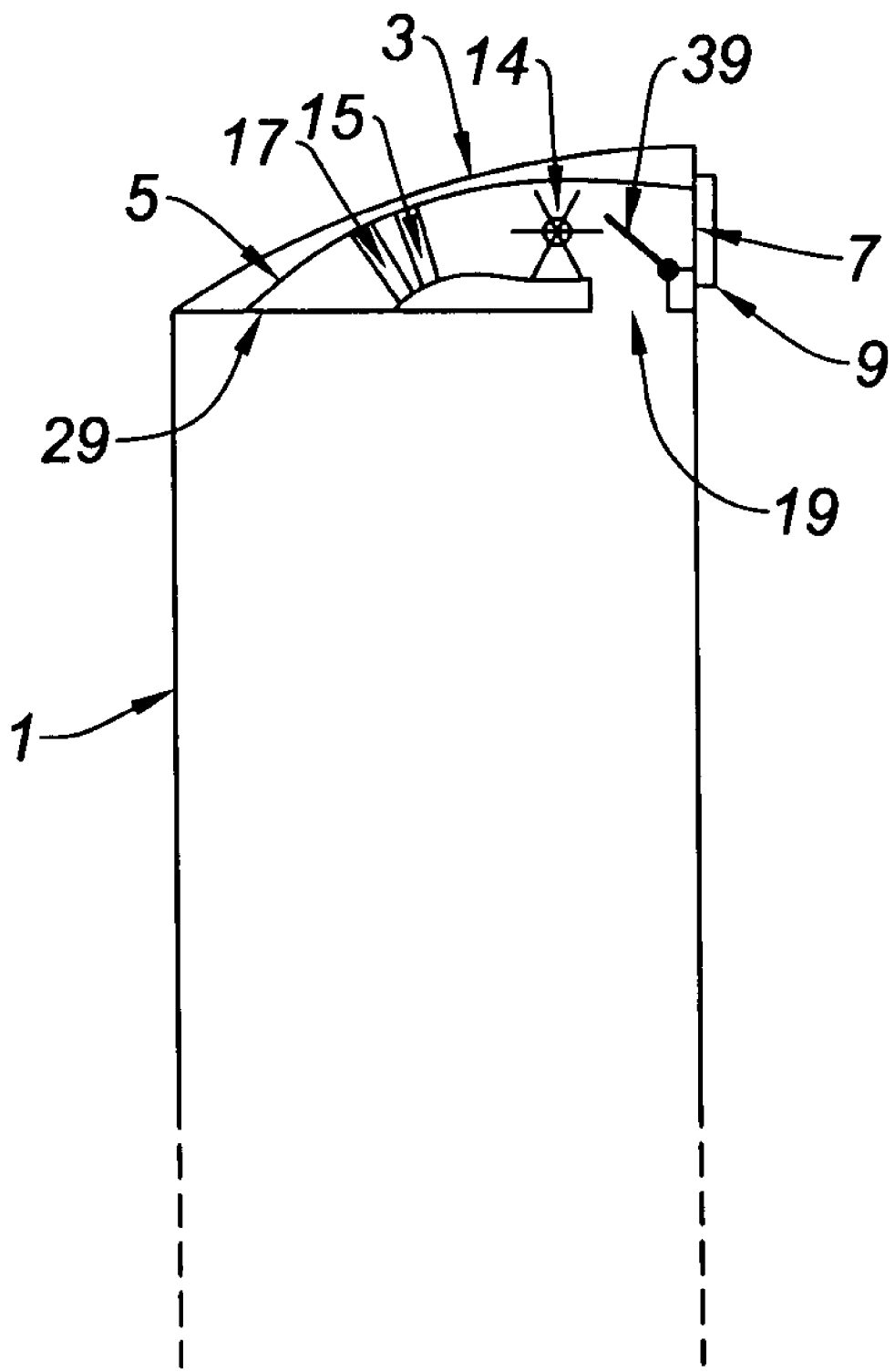
FIG. 6 is a fragmentary view of a fourth embodiment of the invention.

It should be observed that the embodiment shown in FIGS. 4 and 5 can be advantageously improved by replacing the first flap 11 and the third flap 35 by a single, common flap 39 that is movable between a position in which it closes the air intake 7, and a position in which it closes the recycling inlet 19 (see FIG. 6).

As can be understood in the light of the above description, the ventilation system of the invention enables the cab 1 to be isolated automatically from the outside when the operator starts spraying operations, and conversely enables non-polluted outside air to be caused to penetrate automatically into the inside of the cab 1 when the operator stops spraying operations.

In practice, this changeover from one mode of ventilation to the other can take place at the ends of a field when the operator interrupts spraying while turning round, or when passing from a field-spraying mode to a road-transport mode.

This automatic changeover from one mode of ventilation to another as a function of the spraying function being activated and/or deactivated frees the operator from paying any attention to the mode of operation applied to ventilating the inside of the cab: the operator can thus pay full attention to the work in progress while being totally protected from untimely entry into the inside of the cab by air polluted by agricultural chemicals.

Naturally, the present invention is not limited in any way to the embodiments described and shown, which embodiments are given by way of illustrative and non-limiting example.

Thus, the invention applies to a ventilation system that need not include filter means, and/or that need not include means for heating and/or cooling cab air.

The invention thus also applies to any cab of a machine used in spraying works, and in particular to the cab of a tractor for carrying or towing a sprayer.

It is thus also possible to provide a time delay for delaying the opening of the first closure means relative to the moment when the spraying operation is deactivated, thus making it possible to ensure that there remains no air that has been polluted by spraying at the time when the first closure means are opened.

The invention claimed is:

1. A ventilation system for a cab of an agricultural machine having a agricultural chemical sprayer mounted exteriorly of the cab and which agricultural sprayer is operatively controlled by a person within the cab, the ventilation system comprising:
    at least one outside air intake;
    at least one air outlet opening out into the cab;
    means for causing incoming air coming from the outside air intake to flow through the at least one air outlet and into the cab;
    a first closure means for selectively opening and closing said outside air intake; and
    control means mounted within the cab and being operably connected to the agricultural sprayer for controlling the agricultural sprayer to activate spraying and to deactivate spraying;
    filter means for filtering the incoming air;
    the control means also being connected to the first closure means in such a manner that the first closure means closes the at least one outside air intake to prevent chemicals from entering into the cab in response to the control means activating the agricultural sprayer to begin spraying and such that the first closure means opens the at least one outside air intake to allow outside air to enter the cab in response to the control means deactivating the agricultural sprayer to stop spraying.

2. The ventilation system according to claim 1, including means for modifying the temperature of the air before being discharged through the at least one air outlet opening into the cab.

3. The ventilation system according to claim 1, including an air outlet from the cab and third closure means for selectively opening and closing the air outlet, the third closure means being operably connected to the control means in such a manner that the third closure means closes the air outlet in response to the control means activating the agricultural sprayer to begin spraying and opens the third closure means when the control means deactivates the agricultural sprayer to stop spraying.

4. The ventilation system according to claim 1, including means for delaying the opening of the first closure means relative to a moment at which the control means deactivates the agricultural sprayer to stop spraying.

5. An agricultural machine having a chemical sprayer and a cab for an operator, and the ventilation system in accordance with claim 1.

6. The ventilation system according to claim 1, including at least one recycling inlet for recycling the air in the cab through the at least one air outlet opening.

7. The ventilation system according to claim 6, including a second closure means for selectively closing the at least one recycling inlet, the second closure means being operatively connected to the control means in such a manner that the second closure means opens the at least one recycling inlet when the control means activates the agricultural sprayer to begin spraying and closes the at least one recycling inlet when the control means deactivates the agricultural sprayer to stop spraying.

8. The ventilation system according to claim 7, in which the first and second closure means are formed as a single flap mounted for selectively closing either the at least one air intake or the at least one recycling inlet.

* * * * *